US012567644B2

(12) United States Patent
Einoegg et al.

(10) Patent No.: US 12,567,644 B2
(45) Date of Patent: Mar. 3, 2026

(54) BATTERY HOUSING WITH A PROTECTIVE CAP, BATTERY AND MOTOR VEHICLE

(71) Applicant: Bayerische Motoren Werke Aktiengesellschaft, Munich (DE)

(72) Inventors: Florian Einoegg, Marktoberdorf (DE); Felix Laasch, Munich (DE); Alexander Mueller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 824 days.

(21) Appl. No.: 17/793,087

(22) PCT Filed: Mar. 1, 2021

(86) PCT No.: PCT/EP2021/055012
§ 371 (c)(1),
(2) Date: Jul. 15, 2022

(87) PCT Pub. No.: WO2021/197733
PCT Pub. Date: Oct. 7, 2021

(65) Prior Publication Data
US 2023/0038944 A1 Feb. 9, 2023

(30) Foreign Application Priority Data
Apr. 2, 2020 (DE) ..................... 10 2020 109 148.6

(51) Int. Cl.
*H01M 50/342* (2021.01)
*H01M 50/30* (2021.01)
(Continued)

(52) U.S. Cl.
CPC ..... *H01M 50/3425* (2021.01); *H01M 50/394* (2021.01)

(58) Field of Classification Search
CPC . F16K 17/363; H01M 50/308; H01M 50/325; H01M 50/3425; H01M 50/394
See application file for complete search history.

(56) References Cited

U.S. PATENT DOCUMENTS

| | | |
|---|---|---|
| 2010/0233520 A1 | 9/2010 | Suzuki et al. |
| 2017/0331090 A1 | 11/2017 | Li et al. |
| 2020/0365858 A1* | 11/2020 | Jaspers ................. F16K 17/403 |

FOREIGN PATENT DOCUMENTS

| | | |
|---|---|---|
| CN | 203631627 U | 6/2014 |
| DE | 10 2018 125 110 A1 | 4/2020 |

(Continued)

OTHER PUBLICATIONS

International Search Report (PCT/ISA/210) issued in PCT Application No. PCT/EP2021/055012 dated Apr. 29, 2021 with English translation (six (6) pages).

(Continued)

*Primary Examiner* — Basia A Ridley
*Assistant Examiner* — Heng M. Chan
(74) *Attorney, Agent, or Firm* — Crowell & Moring LLP

(57) ABSTRACT

A battery housing includes at least one membrane-like degassing element which is designed to yield when a hot gas of the at least one battery cell is released into an interior of the battery housing, and in so doing to open up a degassing opening in the housing wall for discharging the hot gas from the interior to an area surrounding the battery housing, and at least one protective cap which, for protecting the at least one degassing element against environmental influences, is arranged on an outer side of the housing wall in a manner overlapping the at least one degassing element and which is fastened to the housing wall by way of a holding device, wherein the holding device is designed to yield, and to completely release the protective cap from the degassing
(Continued)

opening, when the hot gas is discharged via the at least one degassing element.

8 Claims, 1 Drawing Sheet

(51) Int. Cl.
  *H01M 50/308*    (2021.01)
  *H01M 50/325*    (2021.01)

(56)        References Cited

FOREIGN PATENT DOCUMENTS

| | | |
|---|---|---|
| EP | 3 739 667 A1 | 11/2020 |
| JP | 2003-346762 A | 12/2003 |
| JP | 2013-89375 A | 5/2013 |
| WO | WO 2013/121990 A1 | 8/2013 |

OTHER PUBLICATIONS

German-language Written Opinion (PCT/ISA/237) issued in PCT Application No. PCT/EP2021/055012 dated Apr. 29, 2021 (seven (7) pages).
German-language Search Report issued in German Application No. 10 2020 109 148.6 dated Nov. 2, 2020 with partial English translation (12 pages).
English translation of Chinese-language Office Action issued in Chinese Application No. 202180008352.X dated Jun. 30, 2023 (6 pages).

* cited by examiner

BATTERY HOUSING WITH A PROTECTIVE CAP, BATTERY AND MOTOR VEHICLE

BACKGROUND AND SUMMARY OF THE INVENTION

The invention relates to a battery housing for a battery of a motor vehicle, the battery housing being designed to accommodate at least one battery cell of the battery and having at least one membrane-like degassing element which is arranged on a housing wall of the battery housing and is designed to yield when a hot gas of the at least one battery cell is released into an interior of the battery housing, and in so doing to open up a degassing opening in the housing wall for discharging the hot gas from the interior to a surrounding environment of the battery housing. The invention additionally relates to a battery and to a motor vehicle.

At present, interest is focused on batteries for motor vehicles which can be used for example as traction batteries for electrically driveable motor vehicles. Such a battery usually has multiple battery cells, which are arranged in an interior of a battery housing of the battery. In a fault scenario, for example a short-circuit within a cell, of one of the battery cells, this cell may perform an emergency degassing by letting out a hot gas from its cell housing into the interior of the battery housing. In order to discharge the hot gas from the interior, the battery housing usually has at least one degassing element, which is arranged on a housing wall of the battery housing. Such a degassing element can be a bursting membrane, which yields, for example tears or bursts, as the hot gas appears in the interior and thus opens up a degassing opening in the housing wall to let the hot gas out into a surrounding environment of the battery.

In order to be able to let out the hot gas reliably, such membrane-like degassing elements have a high sensitivity. However, the membrane-like degassing element may also yield on account of external influences or ambient influences, for example on account of the action of water, and therefore may be destroyed unintentionally. These ambient influences can then infiltrate the interior of the battery housing and damage the components located there.

It is the object of the present invention to be able to protect a battery of a motor vehicle in a simple way against ambient influences.

This object is achieved by a battery housing, a battery, and a motor vehicle having the features according to the claimed invention.

A battery housing according to an embodiment of the invention for a battery of a motor vehicle is designed to accommodate at least one battery cell of the battery and has at least one membrane-like degassing element which is arranged on a housing wall of the battery housing. The at least one degassing element is designed to yield when a hot gas of the at least one battery cell is released into an interior of the battery housing, and in so doing to open up a degassing opening in the housing wall for discharging the hot gas from the interior to a surrounding environment of the battery housing. The battery housing additionally has at least one protective cap which, for protecting the at least one degassing element against environmental influences, is arranged on an outer side of the housing wall in a manner overlapping the at least one degassing element and which is fastened to the housing wall by way of a holding device. The holding device is designed to yield, and to completely release the protective cap from the degassing opening, when the hot gas is discharged via the at least one degassing element.

The invention additionally relates to a battery for a motor vehicle comprising at least one battery cell and a battery housing according to an embodiment of the invention, the battery housing being designed to accommodate the at least one battery cell. The rechargeable battery or the accumulator is in particular in the form of a traction battery for an electrically driveable motor vehicle. The battery is preferably in the form of a high-voltage energy store. The battery in particular has multiple battery cells, which are arranged in the interior of the battery housing. The battery cells can, for example, be in the form of prismatic battery cells, round cells or pouch cells. In a fault scenario, for example in the event of a short circuit within a cell, of a battery cell, this battery cell can let out a hot gas into the interior of the battery housing in order to reduce the internal pressure.

The battery housing has housing walls, for example in the form of a housing lower part or housing base and a housing upper part or housing cover, which enclose an interior for accommodating the battery cells. The at least one membrane-like degassing element or the at least one degassing membrane is arranged on at least one of the housing walls, for example on the housing cover. The degassing element can be, for example, a film-like bursting membrane, which in the normal scenario, that is to say in the absence of a fault scenario and thus the hot gas, covers or closes a degassing opening in the housing wall. In a fault scenario, that is to say with the presence of a critical amount of hot gas in the interior, the degassing membrane yields, for example by tearing or bursting, and thus opens up the degassing opening to discharge the hot gas from the interior into the surrounding environment of the battery.

In order to prevent the sensitive degassing element from being destroyed by ambient influences, for example the action of water or action of dirt, the at least one protective cap or protective cover is arranged on the outer side of the housing wall facing the surrounding environment. The protective cap covers the degassing element and thus protects it against ambient influences. The protective cap can be formed for example from a plastics material. The protective cap is fastened to the outer side of the housing wall via the holding device. The degassing element is preferably breathable for pressure equalization between the interior and the surrounding environment of the battery housing and the protective cap is fastened to the housing wall air-permeably by way of the holding device. The degassing element and the protective cap thus allow an exchange of air with the surrounding environment for pressure equalization.

In order to ensure that the hot gas can be reliably delivered to the surrounding environment via the degassing element, the holding device releases the connection between the protective cap and the housing wall in the event that the hot gas is escaping via the degassing element. For example, the holding device is designed to fasten the protective cap to the outer side of the housing wall by way of a form-fitting connection that is releasable as a result of the escape of the hot gas. The protective cap is removed here fully from the degassing opening, so that a complete flow cross-section of the degassing opening is available for the discharge of the hot gas. Due to the holding device that releases as a result of the escape of hot gas, the protective cap is thus prevented from blocking the discharge of the hot gas. In addition, solid particles which are transported by the hot gas can escape from the interior of the battery housing due to the releasing protective cap. Otherwise, that is to say with a non-releasing protective cap, the particles would collect in the degassing opening and would reduce the flow cross-section or even block the hot gas discharge.

The holding device can additionally be designed, for example, to hold the at least one degassing element on the housing wall. The holding device is arranged here on the outer side of the housing wall in the region of the degassing opening and holds the degassing membrane so that it closes off the degassing opening in the normal scenario.

By providing the protective cap, the sensitive degassing element can be reliably protected against ambient influences. Due to the holding device that releases as hot gas is discharged, a reliable degassing of the battery can be ensured.

It can also be provided that the protective cap is fastened to the housing wall by way of a catch device, which is designed to hold the protective cap on the battery housing away from the degassing opening when the protective cap releases as hot gas exits the degassing opening. Such a catch device can be a catch line. The catch device does not block the release of the protective cap from the degassing opening in the event that hot gas is escaping, but catches the releasing protective cap. The catch device thus ensures that the protective cap does not release in uncontrolled fashion from the battery housing, but holds the protective cap, after its release, in a defined position on the battery housing.

In a development of the invention the holding designed is designed to fasten the protective cap to the outer side of the housing wall by way of a snap-fit connection, wherein the protective cap and the outer side of the housing wall have connection elements that correspond to one another. In particular, at least one first connection element of the holding device is formed as an elastic snap-fit hook element and at least one second connection element is formed as a rigid locking element with an undercut. Here, in particular at least two snap-fit hook elements and two locking elements are arranged opposite one another, so that the protective cap is fastened to the housing wall at least at two opposite points. The at least one snap-fit hook element is in particular an offset spring hook. In other words, a snap-fit hook head of the snap-fit hook element, the snap-fit hook head being arranged on an elastic rib of the snap-fit hook element, has a protrusion. The protrusion is arranged in the region of the undercut of the locking element and is thus form-fittingly connected to the locking element. If, by way of the hot gas, a release force that exceeds a holding force of the snap-fit connection is applied to the snap-fit connection, the snap-fit hook head is removed again from the undercut and can release the snap-fit connection. At the same time, the protective cap is also removed completely from the degassing opening by the pressure of the hot gas.

It can be provided that the protective cap has a top face and a collar that runs peripherally around the top face at least in some regions, wherein at least one of the connection elements, for example the at least one locking element, are arranged inwardly of the peripheral collar, on an inner side of the top face facing the degassing element, and wherein the at least one other connection element, for example the at least one snap-fit hook element, is arranged on the outer side of the housing wall. In particular the at least one connection element is formed in one part with the protective cap. The protective cap and the at least one connection element on the protective cap, however, can also be formed in a number of parts. To this end, the protective cap and the at least one connection element can also be formed from different materials. The protective cap can be pot-shaped, for example, and can have a round top face. The protective cap, however, can also have a different shape. The at least one connection element thus protrudes downwardly, parallel to the collar, from the top face. The other connection element protrudes upwardly from the housing wall. The collar of the protective cap, when the protective cap is arranged on the housing wall, overlaps the at least one locking element and the at least one snap-fit hook element connected thereto. The collar is used, for example, to prevent an infiltration of water and dirt laterally into an intermediate region between the degassing element and the protective cap.

The invention additionally includes a motor vehicle which has a battery according to an embodiment of the invention. The motor vehicle is formed in particular as an electric or hybrid vehicle.

The embodiments presented with reference to the battery housing according to the invention and their advantages apply correspondingly for the battery according to embodiments of the invention and also for the motor vehicle according to embodiments of the invention.

Further features of the invention are provided by the claims, the figures, and the figure description. The features and feature combinations mentioned above in the description and also the features and feature combinations mentioned hereinafter in the figure description and/or shown in isolation in the figures are usable not only in the stated combinations, but also in other combinations or in isolation.

The invention will now be explained in greater detail on the basis of an exemplary embodiment and with reference to the drawings.

DETAILED DESCRIPTION OF THE DRAWINGS

In the figures, like and functionally like elements are provided with the same reference signs.

Figure 1:
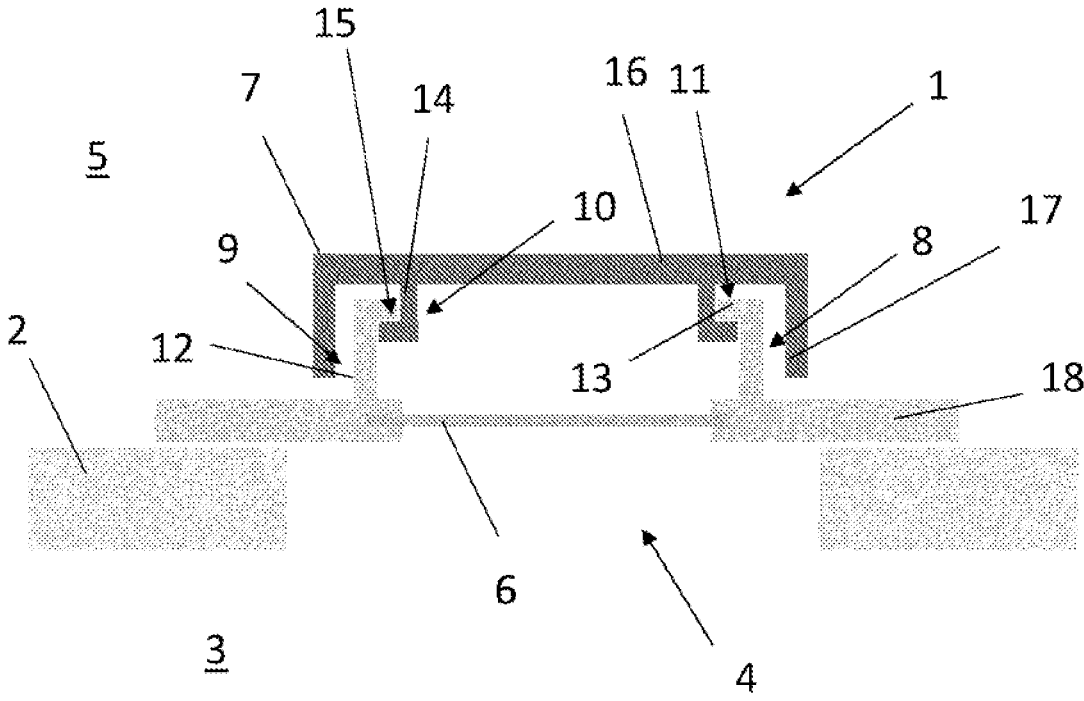
FIG. 1 shows a schematic illustration of a battery housing for a battery of a motor vehicle in the normal scenario.

FIG. 1 shows a battery housing 1 for a battery of a motor vehicle. The battery housing 1 has housing walls 2, which enclose an interior 3 for receiving battery cells (not shown here) of the battery. A degassing opening 4 is arranged in at least one housing wall 2, and hot gas that collects in the interior 3 in a fault scenario of at least one battery cell can escape through the degassing opening into a surrounding environment 5 of the battery. The degassing opening 4 is covered by a membrane-like degassing element 6. In the normal scenario, the degassing element 6 closes the battery housing 1 in the absence of a fault. The degassing element 6 is formed in particular as a breathable, air-permeable membrane, which allows an exchange of air between the interior 3 and surrounding environment 5 for pressure equalization. In a fault scenario, this membrane can tear and thus open up the degassing opening 4.

In order to prevent the degassing element 6 from being destroyed by ambient influences, the battery housing 1 has a protective cap 7, which covers the degassing element 6. The protective cap 7 is to this end fastened to an outer side of the housing wall 2 via a holding device 8 and is arranged overlapping the degassing element 6. The holding device 8 provides a connection between the housing wall 2 and the protective cap 7, the connection being releasable as a result of the discharge of the hot gas. To this end, the holding device 8 has at least one first connection element 9 on the housing wall 2 and at least one second connection element 10 on the protective cap 7. The connection elements 9, 10 form in particular a form-fitting connection, which is formed here as a snap-fit connection 11.

To this end, the at least one first connection element 9 is formed here as an elastic snap-fit hook element 12, which is arranged on the housing wall 2. The snap-fit hook elements 12 have an angled snap-fit hook head 13. The at least one second connection element 10 is formed here as a rigid locking element 14 with an undercut 15. The locking elements 14 are formed here in one part with the protective cap 7, which has a top face 16 and a collar 17. The locking elements 14 are arranged inwardly of the collar 17, on the top face 16 protruding in the direction of the housing wall 2. However, it could also be that the first connection elements 9 are formed as the rigid locking elements 14 and the second connection elements 10 are formed as the elastic snap-fit hook elements 12. The snap-fit hook head 13 is arranged in this undercut 15. Here, the collar 17 surrounds the interconnected connection elements 9, 10. The snap-fit hook elements 12 are arranged here on a carrier 18 of the holding device 8, the carrier being arranged on the outer side of the housing wall 2 and carrying here the degassing element 6 at the same time.

Figure 2:
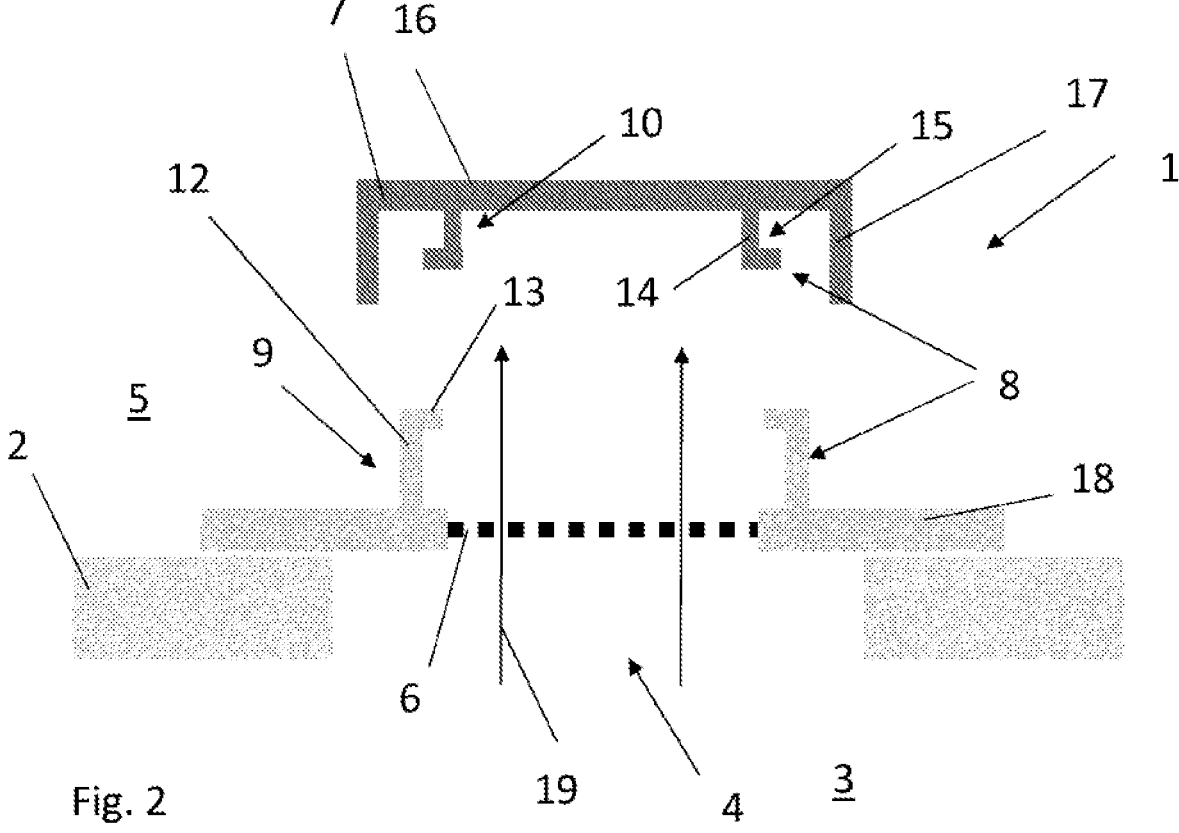
FIG. 2 shows the battery housing according to FIG. 1 in a fault scenario.

If the hot gas, as shown in FIG. 2, now escapes via the degassing opening 4 opened up by the burst degassing element 6 and exerts a pressure 19 on the protective cap 7, the connection between the protective cap 7 and the housing wall 2 thus releases, and the protective cap 7 is fully removed from the degassing opening 4. The hot has can thus escape reliably from the interior 3 into the surrounding environment 5. The connection provided by the holding device 8 is thus releasable by the hot gas, but not by ambient influences, and therefore the protective cap 7 on the one hand reliably allows the discharge of hot gas and on the other hand reliably protects the degassing element 6 against ambient influences.

What is claimed is:

1. A battery housing for a battery of a motor vehicle, the battery housing being configured to accommodate at least one battery cell of the battery, the battery housing comprising:

at least one membrane-like degassing element which is arranged on a housing wall of the battery housing and is configured to yield when a hot gas of the at least one battery cell is released into an interior of the battery housing, and in so doing to open up a degassing opening in the housing wall for discharging the hot gas from the interior of the battery housing to a surrounding environment of the battery housing, and at least one protective cap which, for protecting the at least one degassing element against environmental influences, is arranged on an outer side of the housing wall in a manner overlapping the at least one degassing element and which is fastened to the housing wall by a holding device, wherein:

the holding device is configured to yield, and to completely release the protective cap from the degassing opening, when the hot gas is discharged via the at least one degassing element, the holding device is further configured to fasten the protective cap to the outer side of the housing wall by a snap-fit connection, the protective cap and the outer side of the housing wall have connection elements that correspond to one another, the outer side of the housing includes at least one first connection element of the connection elements that is formed as an elastic snap-fit hook element, and the protective cap includes at least one second connection element of the connection elements that is formed as a rigid locking element with an undercut.

2. The battery housing according to claim 1, wherein:

the degassing element is breathable for pressure equalization between the interior of the battery housing and the surrounding environment of the battery housing, and the protective cap is fastened to the housing wall airpermeably by the holding device.

3. The battery housing according to claim 1, wherein the holding device is further configured to hold the at least one degassing element on the housing wall.

4. The battery housing according to claim 1, wherein the holding device is further configured to fasten the protective cap to the outer side of the housing wall by a form-fitting connection.

5. The battery housing according to claim 1, wherein:

the protective cap has a top face and a collar that runs peripherally around the top face at least in some regions, the at least one second connection element is arranged inwardly of the peripheral collar, on an inner side of the top face facing the degassing element, and the at least one first connection element is arranged on the outer side of the housing wall.

6. The battery housing according to claim 1, wherein the protective cap is additionally fastened to the housing wall by a catch device, which is configured to hold the protective cap on the battery housing away from the degassing opening when the protective cap releases as the hot gas exits the degassing opening.

7. A battery for a motor vehicle, the battery comprising:

at least one battery cell, and the battery housing according to claim 1, wherein the battery housing is configured to accommodate the at least one battery cell.

8. A motor vehicle comprising the battery according to claim 7.

\* \* \* \* \*